United States Patent [19]

Gutleber

[11] Patent Number: 4,475,214
[45] Date of Patent: Oct. 2, 1984

[54] CW INTERFERENCE CANCELLING SYTEM FOR SPREAD SPECTRUM SIGNALS UTILIZING ACTIVE COHERENT DETECTION

[75] Inventor: Frank S. Gutleber, Little Silver, N.J.

[73] Assignee: The United States of America as represented by the Secretary of the Army, Washington, D.C.

[21] Appl. No.: 433,761

[22] Filed: Oct. 12, 1982

[51] Int. Cl.³ .......................... H04B 1/10; H04J 13/00
[52] U.S. Cl. ........................................ 375/34; 375/96; 375/102; 370/18
[58] Field of Search .................... 370/18,22, 53, 69.1, 370/77, 85, 104, 116; 375/1, 22, 38, 96, 102-104; 340/346, 348, 349; 455/206, 284, 303-306; 364/604, 725, 728, 819, 826

[56] References Cited

U.S. PATENT DOCUMENTS

| | | | |
|---|---|---|---|
| 3,461,451 | 8/1969 | Gutleber | 340/348 |
| 3,634,765 | 1/1972 | Gutleber | 375/96 X |
| 3,870,996 | 3/1975 | Miller | 375/102 |
| 3,908,088 | 9/1975 | Gutleber | 370/104 |
| 4,027,264 | 5/1977 | Gutleber | 455/306 X |
| 4,293,953 | 10/1981 | Gutleber | 375/25 |
| 4,325,068 | 4/1982 | Mercer | 455/304 X |

OTHER PUBLICATIONS

Weik, Martin H., *Communications Standard Dictionary*, Van Nostrand Reinhold Company, 1983, pp. 56,200.

Primary Examiner—Robert L. Griffin
Assistant Examiner—Albert W. Watkins
Attorney, Agent, or Firm—Anthony T. Lane; Sheldon Kanars; Jeremiah G. Murray

[57] ABSTRACT

A noise coded communications system which eliminates continuous wave (CW) interference while providing no loss or degradation of the desired signal includes the variable delay line and a linear adder coupled to the output of the front end section of a multiplexed noise coded receiver which further includes an active coherent detector comprised of a multiplier and an integrator. The variable delay line provides a delay whose order of magnitude is substantially equal to the bit width of the multi-bit binary noise code utilized and is further varied until any CW interference signal received along with the noise coded signal is shifted in phase by 180° and inverted with respect to the input interference signal. The inverted interference signal and the non-inverted input interference signal are summed together in the linear adder whereupon a cancellation of the interference signal occurs while providing no degradation in the desired signal.

2 Claims, 3 Drawing Figures

CW INTERFERENCE CANCELLING SYTEM FOR SPREAD SPECTRUM SIGNALS UTILIZING ACTIVE COHERENT DETECTION

The invention described herein may be manufactured, used and licensed by or for the Government for governmental purposes without the payment to me of any royalties thereon.

CROSS REFERENCE TO RELATED APPLICATION

This application is related to: U.S. Serial No. 413,953, entitled, "CW Interference Cancelling System For Spread Spectrum Signals", filed in the name of Frank S. Gutleber, the present inventor, on Sept. 1, 1982; U.S. Ser. No. 423,751, entitled "Pulse Interference Cancelling System For Spread Spectrum Signals", filed in the name of Frank S. Gutleber, on Sept. 27, 1982; and U.S. Ser. No. 434,668 entitled, "Pulse Interference Cancelling System For Spread Spectrum Signals Utilizing Active Coherent Detection", filed in the name of Frank S. Gutleber, on Oct. 15, 1982.

FIELD OF THE INVENTION

This invention relates generally to noise code communications systems and more particularly to a continuous wave interference cancelling system therefor.

BACKGROUND OF THE INVENTION

As is well known and understood, perhaps the most common method of reducing continuous wave (CW) interference is through the use of bandpass notch filters. However, as applied in audio communications systems and particularly in defense communications systems, the use of such filters has certain inherent limitations inasmuch as passive, low frequency filtering requires relatively large and therefore expensive inductors and capacitors. Additionally, the filtering also tends to distort the voice signal and thus deteriorates its intelligibility. Furthermore, the filtering is implemented around a preset frequency which permits the signal to be jammed merely by changing to jamming frequencies out of the bandpass of the notch filters.

One known type of interference cancelling system is shown and described in U.S. Pat. No. 4,027,264, entitled, "Phase Lock Loop Multi-tone Interference Cancelling System" issued to Frank S. Gutleber, the present inventor, on May 31, 1977. The interference cancelling system of that system employs a phase lock loop which is utilized as a narrow band tracking filter to adaptively lock to interference tones to be cancelled by the process of signal subtraction.

In the above referenced related application entitled, "CW Interference Cancelling System For Spread Spectrum Signals", the CW interference is eliminated by means of a variable delay line and a liner adder which is interposed between a receiver, responsive to orthogonal multiplexed noise codes, and a passive matched filter and linear adder which operate to time compress the coded signals to a lobeless signal. The delay line operates to provide an inverted interference signal from an input interference signal which is exactly 180° out of phase with respect to the input interference signal. By adding the delay signal to the input signal in the linear adder, a total cancellation of the interference signal is provided while the signal level of the noise coded communications signal at the output of the receiver remains unchanged.

The present invention is particularly adapted for use with communications systems utilizing noise coded signals. Such systems, furthermore, are well known and are particularly desirable because they exhibit an immunity against interference and jamming. Noise coded means that information is coded with a code that is "noise like" in that it will compress to an impulse when detected with a matched filter. In particular, one class of such noise codes are known wherein pairs of coded signals termed "code mates" have autocorrelation functions which provide a peak output at a given time and a zero output or outputs having the same magnitude but opposite polarity at all other times. For example, when the code mates are multiplexed, matched filter detected and linearly added, there is provided a lobeless impulse output of a relatively high amplitude at a given time and a zero output at all other times. Such codes and systems utilizing such codes are typically shown and described in U.S. Pat. No. 3,461,451, entitled, "Code Generator To Produce Permutations Of Code Mates", which issued to Frank S. Gutleber on Aug. 12, 1969; U.S. Pat. No. 3,634,765, entitled, "Systems To Provide An Impulse Autocorrelation Function ... Of One Or More Of Said Code Signals", which issued to Frank S. Gutleber on Jan. 11, 1972; and U.S. Pat. No. 3,908,088, entitled, "Time Division Multiple Access Communications System", which issued to Frank S. Gutleber on Sept. 23, 1975.

SUMMARY OF THE INVENTION

Accordingly, it is an object of the present invention to provide an improved noise coded communications system.

Another object of the present invention is to provide an improved noise coded communications system which eliminates continuous wave or slowly varying continuous wave interfering signals.

Still another object of the present invention is to provide an improved noise coded communications system which totally eliminates continuous wave or slowly varying continuous wave interference while providing no loss and substantially no degradation of the desired signal.

And yet another object of the present invention is to provide a CW canceller for a noise coded communications receiver which utilizes active coherent detection.

Accordingly, these and other objects are achieved by means of a variable delay line and a linear adder coupled to the output of the front section of a multiplexed noise coded receiver including an active coherent detector. The variable delay line provides a delay whose order of magnitude is substantially equal to $\tau$ which is the bit width of the multi-bit binary noise code utilized and is further varied until any input CW interference signal received along with the noise coded signal is altered in phase by exactly 180° and is thus inverted with respect to the input interference signal. The inverted interference signal and the non-inverted input interference signal are summed together in the linear adder whereupon a complete cancellation of the interference signal occurs while causing no degradation in the noise coded signal. The noise coded signal is subsequently detected in an active coherent detector comprised of, for example, a correlation detector which includes a multiplier and an integrator.

DETAILED DESCRIPTION OF THE PREFERRED EMBODIMENT

Figure 1:
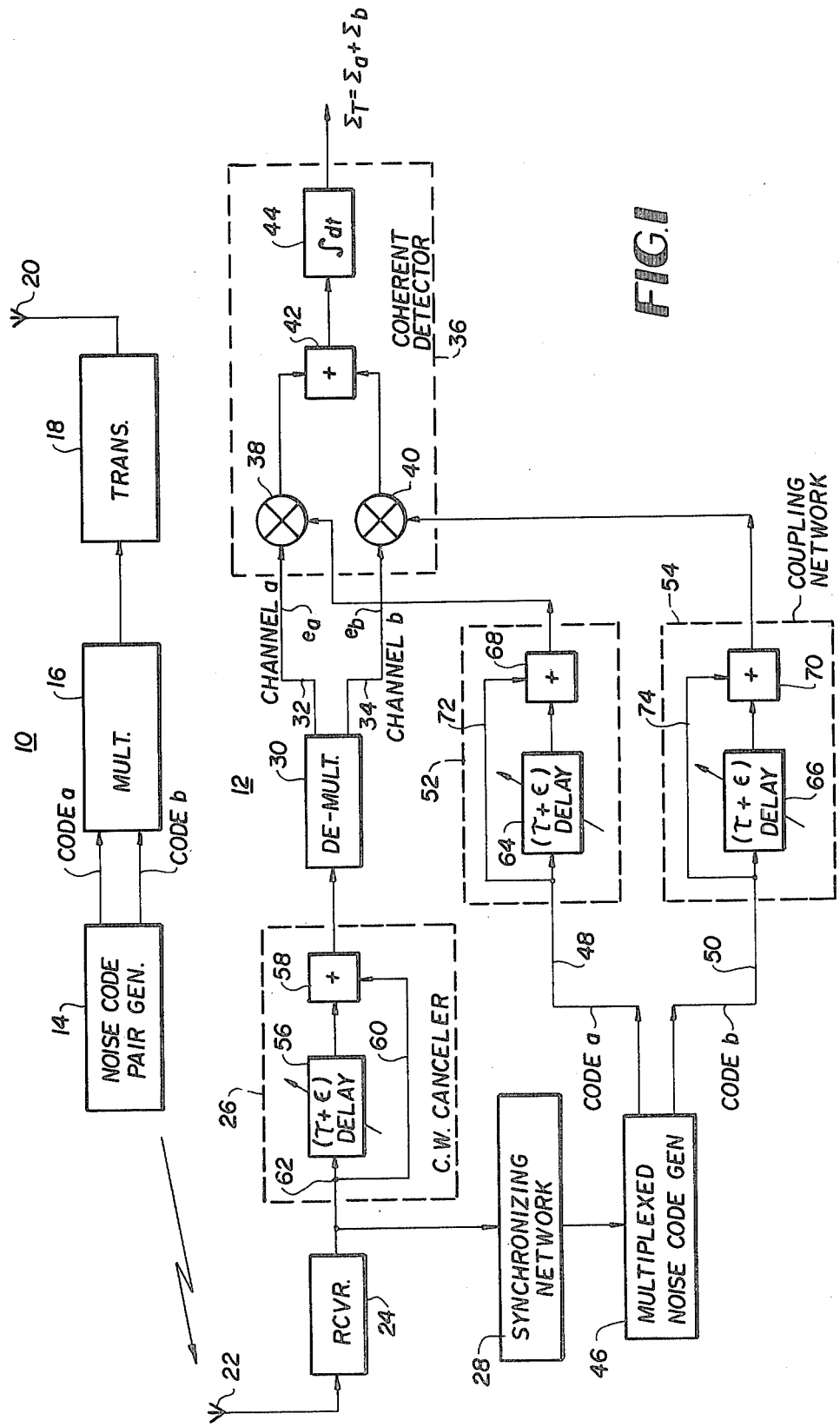
FIG. 1 is a functional block diagram of a noise coded communications system including a CW interference canceller in combination with an active correlation detector in accordance with the subject invention.

Referring now to the drawings and more particularly to FIG. 1, reference numeral 10 denotes a multiplexed noise code transmitter which generates and transmits a noise code modulated RF signal to a receiver 12. The transmitter 10, moreover, includes a noise code generator section 14 which is adapted to generate a pair of spread spectrum noise codes a and b which belong to a class of codes that possess a lobeless impulse autocorrelation function and as such are of the type shown and described in the aforementioned U.S. Pat. Nos. 3,461,451 and 3,634,765. The pair of noise codes a and b are fed to a multiplexer 16 which is coupled to an RF transmitter section 18 whose output is coupled to a radiating antenna 20.

Figure 2:
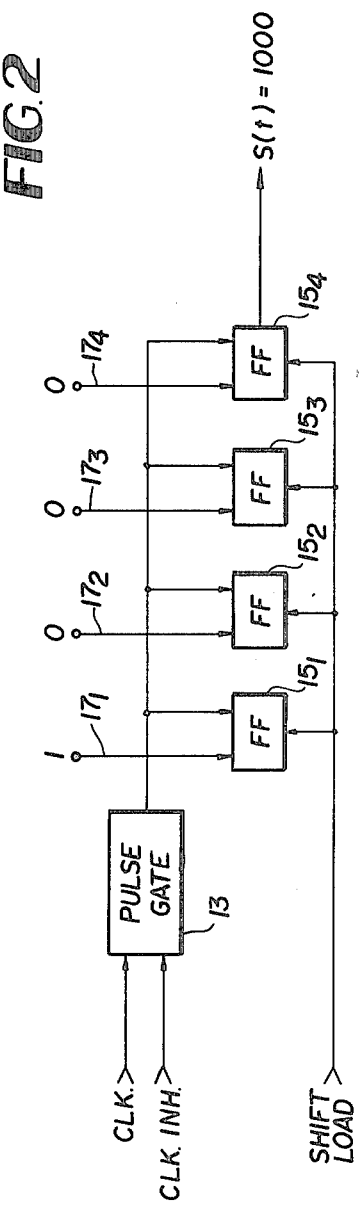
FIG. 2 is a functional block diagram illustrative of a typical active multi-bit binary code generator utilizable in the system shown in FIG. 1.

In the above related co-pending application Ser. No. 413,953 entitled, "CW Interference Cancelling System For Spread Spectrum Signals" and specifically incorporated herein by reference, there is disclosed a passive type of code generator wherein each pair of noise codes is generated by delaying an input pulse by multiples of the code bit width with a tapped delay device and summing all of the inputs with each other, the bits being inverted or not inverted as necessary to form the desired code. While this type of apparatus may be utilized in the noise code pair generator 14, another example of a suitable type of code generator is shown in FIG. 2 and comprises an an bit shift register including, for example, a gate 13 and, where a four bit code is required, four flip-flops $15_1$, $15_2$, $15_3$ and $15_4$. As is well known, a clock pulse signal applied through the gate 13 sequentially shifts each binary code bit (1 or 0) set into each of the flip-flops $15_1 \ldots 15_4$ via control inputs $17_1$, $17_2$, $17_3$ and $17_4$ using shift load and clock inhibit control signals coupled to the flip-flops $15_1 \ldots 15_4$ and the gate 13 respectively. Accordingly, flip-flop $15_4$ outputs one code of a pair of codes a and b where, for example, code a=s(t)=1000. In order to generate code b, the apparatus shown in FIG. 2 would be duplicated with the exception that the binary control inputs applied to the four flip-flops would be changed as required.

Turning attention now to the receiver 12 as shown in FIG. 1, it includes a receiving antenna 22 which is coupled to a receiver front end section 24 whose output is commonly coupled to a passive continuous wave (CW) interference canceller 26 and a synchronizing network 28. The output of the CW interference canceller 26 connects to a demultiplexer circuit 30 which operates to separately output the noise code signals a and b in respective a and b signal channels. The signal channels are coupled to a coherent or correlation detector 36 which includes a pair of signal multipliers 38 and 40, a linear adder 42 and an integrator 44. The coherent detector 36 comprises a dual channel detector because a pair of noise codes are being received. The other inputs to the two multipliers 38 and 40 comprise locally generated reference noise codes corresponding to the noise codes a and b and are generated by a multiplexed noise code generator 46 which is similar to or identical to the noise code pair generator 14 included in the transmitter portion 10. Accordingly, the local noise code generator 46 outputs code a on digital signal bus 48 while reference code b is provided on a like signal bus 50. The signal buses 48 and 50, furthermore, are respectively coupled to the multipliers 38 and 40 of the coherent detector 36 by means of two identical coupling networks 52 and 54. While the coupling networks 52 and 54, when desirable, may be eliminated in favor of a simple direct connection of the signal buses 48 and 50 to multipliers 38 and 40, they are preferred and are comprised of circuits identical to the CW canceller 26 so that the reference noise codes a and b applied to the coherent detector 36 correspond exactly to the demultiplexed output of the CW canceller 26.

Figure 3:
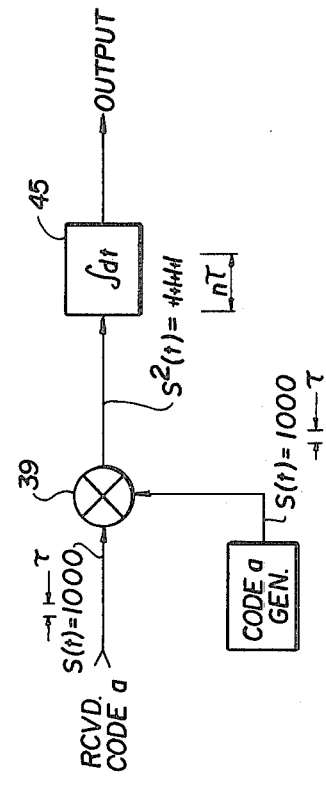
FIG. 3 is a functional block diagram illustrative of a typical active coherent detector utilizable in the system shown in FIG. 1.

Prior to considering the manner in which any CW interference signal received along with the pair of noise codes a and b is suppressed while causing no degradation in the signal level of the received noise codes, the operation of the coherent detector 36 will be clarified. This operation can be best explained by reference to FIG. 3 which is illustrative of a single channel correlation detector. Referring now to FIG. 3, the detector is adapted to actively correlate a received code, for example, code a with a locally generated reference code a where, for example, both the received code and the reference code are comprised of the same multi-bit code s(t)=1000, where the width of each bit is equal to $\tau$. Since the autocorrelation function equation $\phi_s(\tau)$ is defined by the equation, $$\phi_s(\tau) = \int_{-\infty}^{\infty} s(t) \, s(t + \tau) \, dt, \tag{1}$$

it can be seen that autocorrelation involves integration and multiplication. Moreover, the value of $\phi_s(\tau)$ which is equal to the autocorrelation function of s(t) peaks at $\tau=0$ is analogous to matched filter detection of the desired signal taught, for example, in the related application U.S. Ser. No. 413,953. Accordingly, as shown in FIG. 3, received code a is fed to a multiplier 39 whose like counterpart is shown by reference numeral 38 in FIG. 1, as well as an integrator 45. In operation, multiplier 39 translates all of the code bits, which are coincident in time and correlate with one another, into a binary value of +1 which then are integrated over the time period $n\tau$ to provide an output corresponding to the maximum possible value. There is no time compression as in the case of passive matched filter detection as taught in the above referenced related application, U.S. Ser. No. 413,953, since the output time duration of the processed signal is the same as that of the input coded signal. It is the bandwidth that is compressed by the time—bandwidth product, i.e. the number of code bits, of the spread spectrum signal which results from the mechanics of active coherent detection.

To further clarify the analogy between passive pulse compression and active coherent or correlation detection, the autocorrelation function will be computed by employing the correlation process established by the autocorrelation function equation. When the signal is digital, then the autocorrelation function can be expressed more simply as:

$$\phi_s(\tau) = \sum_{i=1}^{i=n-\tau} a_i a_{i+\tau} \quad (2)$$

Using this equation, the autocorrelation function can be obtained for the four bit digital code a signal 1000 as illustrated below.

At $\tau = 0$,
```
        1 0 0 0
     ×  1 0 0 0
Σₐ = +1 +1 +1 +1  = +4 = φₛ(0)
``` where:
```
0 × 0 = +1
1 × 1 = +1
0 × 1 = −1
1 × 0 = −1
```

At $\tau = 1$,
```
        1 0 0 0
     ×    1 0 0 0
Σₐ =  o −1 +1 +1  o  = +1 = φₛ(1)
```

At $\tau = 2$,
```
        1 0 0 0
     ×      1 0 0 0
Σₐ =  o o −1 +1 o o  = 0 = φₛ(2)
```

At $\tau = 3$,
```
        1 0 0 0
     ×        1 0 0 0
Σₐ = o o o −1 o o o  = −1 = φₛ(3)
```

The calculated autocorrelation function values at $\tau=0, 1, 2$ and 3 correspond to the corresponding side lobe levels of the compressed coded pulse when passive pulse compression is employed.

With respect to the subject invention, the two channel coherent detector 36 shown in FIG. 1 comprises a duplication of the multiplier 39 shown in FIG. 3 but with the addition of an adder 42 interposed between the multipliers 38 and 40 and the integrator 44.

Considering now the CW canceller 26 illustrated in FIG. 1, it is shown comprised of a variable time delay circuit 56, a linear adder 58 and a direct connection 60 from the input or circuit node 62 of the time delay circuit 56 and one input to the linear adder 58. The other input to the linear adder 58 comprises the output of the delay circuit 56. The delay circuit 56 is configured, for example, from a variable delay line which is operable to delay a signal applied thereto by a time equal to one code bit width $\tau$ plus a vernier delay of $\epsilon$, where $\epsilon < \tau$, to provide a phase shift of a CW interference signal appearing in a composite received input signal including the received noise coded signal by exactly 180° so that the interference signal is inverted. Thus, for example, a CW interference signal appearing at input circuit node 62 to the time delay circuit 56 will be shifted in phase by 180° and applied to one input of the linear adder 58 while the CW interference signal having no phase shift is coupled to the other input of the linear adder by means of the circuit lead 60. The linear adder 58 operates to sum the two cW interference signals together, causing a cancellation of the interference signal while the noise coded signal appearing at the output of the integrator 44 will remain substantially unchanged and suffer no degradation in its signal level.

The retention of the desired noise coded signal level is readily demonstrated as follows. Where, for example, code a=1000 and code b=1011, where 0 indicates a plus polarity signal of unit amplitude and 1 indicates a minus polarity signal of unit amplitude, first consider the operation of the receiver circuit 12 of FIG. 1 without a CW canceller 26 interposed between the receiver front end section 24 and the demultiplexer 30 as well as the two coupling networks 52 and 54 interposed between the multiplexed noise code generator 46 and the coherent detector 36. In such a configuration, active coherent (correlation) detection of the noise codes occur as follows. Coherent detection for noise code a occurs through multiplier 38 and the integrator 44 in the following fashion,

```
        1 0 0 0
     ×  1 0 0 0
Σₐ = +1 +1 +1 +1  = +4
```

Coherent detection of code b by means of the multiplier 40 and the integrator 44 results in an output $\Sigma_b$ as,

```
        1 0 1 1
     ×  1 0 1 1
Σ_b = +1 +1 +1 +1  = +4
```

The existence of the adder 42 results in a total integrated or summed output $\Sigma_T$ being developed as, $$\Sigma_T = \Sigma_a + \Sigma_b = 4 + 4 = 8$$

where as noted above, $$1 \times 1 = +1$$

$$0 \times 0 = +1$$

$$0 \times 1 = -1$$

$$1 \times 0 = -1$$

It can be seen that the integrated output signal $\Sigma_T$ is eight times larger than the bit amplitude of the multi-bit input signal as a result of coherently summing the eight code bits. Since the input noise is uncorrelated during each code bit interval $\tau$, the output noise voltage will sum on a root mean square (rms) basis, hence the output noise voltage will be the square root of eight times larger than the input noise. The output signal to noise voltage ratio $(S/N)_0$ is therefore enhanced by $8/\sqrt{8} = \sqrt{8}$ over the input signal-to-noise voltage ratio $(S/N)_i$.

In general, $$(S/N)_0 = \sqrt{n} \, (S/N)_i$$

or with respect to the signal-to-noise power ratio P/N, $(P/N)_0 = n(P/N)_i$
where
  n=total number of code bits
  $(P/N)_i$=input signal-to-noise power ratio
  $(P/N)_0$=output signal-to-noise power ratio When the CW interference canceller 26 is interposed between the receiver front end section 24 and the demultiplexer 30, but without the coupling networks 52 and 54 shown in FIG. 1 whereby signal buses 48 and 50 would be directly connected to the multipliers 38 and 40, the coded signal input to the coherent detector 36 appears as follows. The noise code a would appear at the output of the CW canceller 26 and demultiplexer 30 as signal $e_a$ which can be expressed as, $$\begin{array}{r}1\ 0\ 0\ \ 0\ \ \text{(code }a\text{)}\\ +\ \underline{1\ 0\ 0\ 0}\ \ \text{(code }a\text{ delayed by one bit)}\\ e_a = 1\bullet 0^2\ 0^2\ 0\end{array}$$

The exponent indicates the amplitude of the signal bit while the dot represents a zero amplitude.

In a like manner, the noise code b will be summed with a one bit delayed version of itself to provide an output signal $e_b$ as, $$\begin{array}{r}1\ 0\ 1\ 1\ \ \text{(code }b\text{)}\\ +\ \underline{1\ 0\ 1\ 1}\ \ \text{(delayed code }b\text{)}\\ e_b = 1\bullet\bullet 1^2\ 1\end{array}$$

This coded signal $e_b$ likewise appears on circuit lead 34 out of the demultiplexer 30 and is applied to the multiplier 40.

The multiplier 38 and the integrator 44 then provides an output $\Sigma_a$ as:

$$\begin{array}{r}1\bullet\ \ 0^2\ \ 0^2\ 0\\ \times\ \underline{1\ 0\ \ 0\ \ \ 0}\\ \Sigma_a = +1\bullet\ +2\ +2\ \ \ = +5\end{array}$$

The multiplier 40 and the integrator 44 in a like manner outputs an integrated signal $\Sigma_b$ as, $$\begin{array}{r}1\bullet\bullet\ \ 1^2\ 1\\ \times\ \underline{1\ 0\ 1\ \ \ 1}\\ \Sigma_b = +1\bullet\bullet\ +2\ \ = +3\end{array}$$

It can be seen in the manner previously illustrated that the total output signal level $\Sigma_T$ becomes, $$\Sigma_T = \Sigma_a + \Sigma_b = 5+3 = +8$$

As before there is no loss in the output signal level $\Sigma_T$ due to the presence of the delayed signal caused by the time delay circuit 56. Since the interference canceller 26 doubles the noise power as a result of adding the delayed noise to the input noise, there will be a net 3 db degradation in the output signal-to-noise ratio when compared to operating without the interference canceller; however, this loss in signal-to-noise ratio can be regained by simply delaying the reference signal codes a and b by a time delay $(\tau+\epsilon)$ and using it to coherently detect the delayed portion of the composite input signal. Thus, for example, inserting coupling networks consisting only of time delay circuits 64 and 66 between the local multiplexed noise code generator 46 and the multipliers 38 and 40, results in the following outputs of the detector 36 being developed. For the code a channel including the multiplier 38 and the integrator 44, an output $\Sigma_a$ is generated as, $$\begin{array}{r}1\bullet\ \ 0^2\ \ 0^2\ 0\\ \times\ \underline{1\ \ 0\ \ \ 0\ \ \ 0}\\ \Sigma_a = \bullet\bullet\ +2\ +2\ +1\ = +5\end{array}$$

Similarly, the noise code b is coherently detected through multiplier 40 and integrator 44 as signal $\Sigma_b$ which is developed as, $$\begin{array}{r}1\bullet\bullet\ \ 1\ \ 1\\ \times\ \underline{1\ 0\ \ 1\ \ \ 1}\\ \Sigma_b = \bullet\bullet\bullet\ +2\ +1\ = +3\end{array}$$

The total output $\Sigma_T$ from the coherent detector will again be the sum of $\Sigma_a$ and $\Sigma_b$ as, $$\Sigma_T = \Sigma_a + \Sigma_b = 5+3 = +8$$

The output signal level is also +8 when detecting the delayed portion of the input signal. Coherently adding this to the detected undelayed signal then enhances the output P/N by 3 db.

Considering now the circuit arrangement shown in FIG. 1 and particularly the coupling networks 52 and 54, as shown they respectively include the adders 68 and 70, as well as the direct circuit connections 72 and 74 so that they are identical to the circuit configuration of the CW canceller 26. What the coupling networks 52 and 54 provide thereby are reference signals consisting of reference codes a and b summed with a delayed replica of itself in the same manner as occurs in the CW canceller 26. Accordingly, with respect to the code a channel, the multiplier and integrator 44 will operate as follows to produce an output signal $\Sigma_a$ as, $$\begin{array}{r}1\bullet\ \ 0^2\ \ 0^2\ \ 0\\ \times\ \underline{1\bullet\ \ 0^2\ \ 0^2\ \ 0}\\ \Sigma_a = +1\bullet\ +4\ +4\ +1\ = +10\end{array}$$

Multiplying and integrating in the code b channel with the multiplier 40 and the integrator 44, results in a $\Sigma_b$ signal being produced as, $$\begin{array}{r}1\bullet\bullet\ \ 1^2\ \ 1\\ \times\ \underline{1\bullet\bullet\ \ 1^2\ \ 1}\\ \Sigma_b = +1\bullet\bullet\ +4\ +1\ = +6\end{array}$$

The total level of the output signal $\Sigma_T$, is then $\Sigma_T = \Sigma_a + \Sigma_b = +16$ Since the input noise is uncorrelated from bit to bit, the noise signal $N_a$ will sum in the integrator 44 on an rms basis. Therefore, for channel a, $$\begin{array}{r}N_i\ N_i\ N_i\ \ \ N_i\ \ \ N_i\\ \times\ \underline{1\ \bullet\ \ 0^2\ \ \ 0^2\ \ \ 0}\\ N_i\bullet\ +2N_i\ +2N_i\ +N_i\end{array}\ \text{and,}$$

$$N_a = \sqrt{N_i^2 + 4N_i^2 + 4N_i^2 + N_i^2}\ \text{or,}$$

$$N_a = \sqrt{10N_i^2} = \sqrt{10}\ N_i$$

For the noise signal $N_b$ in channel b, $$\begin{array}{r}N_i\ N_i\ N_i\ N_i\ \ N_i\\ \times\ \underline{1\ \bullet\ \ \bullet\ \ 1^2\ \ 1}\\ N_i\bullet\ \ \bullet\ 2N_i\ N_i\end{array}\ \text{and}$$

$$N_b = \sqrt{N_i^2 + 4N_i^2 + N_i^2}$$

$$= \sqrt{6N_i^2} = \sqrt{6}\ N_i$$

And the total noise $N_T$ is then $$N_T = \sqrt{N_a^2 + N_b^2}$$

$$= \sqrt{16} \, N_i$$

The resultant output signal-to-noise voltage ratio is therefore $$(S/N)_0 = \frac{16 S_i}{\sqrt{16} \, N_i} = 4(S/N)_i$$

Or the output signal to noise power ratio is improved by 16 or $(P/N)_O = 16(P/N)_i$ This is an improvement of 2/1 over the case where only the undelayed signal is detected which results in gaining back the 3 db loss incurred by the canceller.

When desirable, several CW cancellers 26 of the type illustrated in FIG. 1 can be coupled in series to eliminate multiple CW interference. It should also be noted that slowly varying CW interference can readily be nullified by forming a closed loop whereby the output interference level would be continuously monitored and the variable delay $(\tau + \epsilon)$ adjusted until the interference is nulled in accordance with the output of some type of null detector, not shown, much in the same fashion as taught in the above referenced U.S. Pat. No. 4,027,264.

While there has been shown and described what is at present considered to be the preferred embodiment of the subject invention, the same has been made by way of illustration and not limitation. Accordingly, all alterations, modifications and changes coming within the spirit and scope of the invention, as defined in the following claims are meant to be included.

I claim:

1. A spread spectrum digital signal communication system, comprising:

menas for generating and transmitting a multiplexed noise coded communication signal comprised of a pair of continuous-stream multi-bit binary digital noise codes of substantially equal bit widths;

means for receiving said multiplexed noise coded communications signal;

means coupled to said receiving means for cancelling a continuous wave interference signal received along with said noise coded communication signal, said cancelling means comprising first circuit means providing substantially no delay of said interference signal and said noise coded communications signal, second circuit means providing a predetermined time delay of said interference signal and said noise coded communications signal, said time delay being of a magnitude to delay said interference signal and said noise coded communications signal by a delay equal to the bit width of said noise coded communications signal and a predetermined additional incremental dealy for providing a 180° inverted phase shift of said interference signal relative to said interference signal having no delay, and a third circuit means for combining the non-delayed and inverted interference signals from said first and second circuit means whereby said interference signals are summed and thereby cancelled;

active coherent detection means coupled to said third circuit means for providing a detected output signal of said noise coded communications signal substantially free of continuous wave interference including first and second multiplier circuit means each having respective first and second inputs and an output, and integrator circuit means coupled to the output of said first and second multiplier circuit means, said second input means of said first and second multiplier means being respectively coupled to one of a pair of reference noise coded signals corresponding to the multiplexed pair of noise coded communications signal transmitted;

means for generating a reference noise coded signal corresponding to said transmitted noise coded signal and synchronized with said pair of received noise coded signals, said reference signal being coupled to said second input means; and first and second coupling networks respectfully coupled between said local signal generator means and said second input means of said first and second multiplier means, said networks each including at least time delay circuit means which provide a signal delay of the respective noise coded reference signal of substantially one bit width.

2. The communications system as defined by claim 1 wherein said first and second coupling means are comprised of networks including first circuit means providing substantially no delay of the respective reference noise coded signal, second circuit means providing a predetermined time delay of the respective reference noise coded communications signal, said time delay being substantially the same as the time delay provided by said second circuit means of said interference signal cancelling means, and third circuit means for combining the respective non-delayed and delayed reference noise coded signals and providing a composite noise coded communications signal to the second input means of said first and second multipliers.

* * * * *